United States Patent [19]

Andrevski et al.

[11] 4,030,815
[45] June 21, 1977

[54] HYDROSTATIC BEARING APPARATUS

[75] Inventors: Zygmunt M. Andrevski, Princeton; Michael Jay Lurie, E. Brunswick, both of N.J.

[73] Assignee: RCA Corporation, New York, N.Y.

[22] Filed: Oct. 31, 1975

[21] Appl. No.: 627,667

[52] U.S. Cl. .............................................. 350/255
[51] Int. Cl.² ......................................... G02B 7/02
[58] Field of Search ............. 354/195; 178/6.6 DD; 179/100.3 V; 350/255; 346/108

[56] References Cited

UNITED STATES PATENTS

| | | | |
|---|---|---|---|
| 3,081,682 | 3/1963 | Khoury | 350/255 |
| 3,511,149 | 5/1970 | Blattner et al. | 350/255 UX |
| 3,519,334 | 7/1970 | Heitmann et al. | 350/255 |
| 3,636,849 | 1/1972 | Alles et al. | 350/255 |

*Primary Examiner*—F. L. Evans
*Attorney, Agent, or Firm*—Eugene M. Whitacre; William H. Meagher; Wendell K. Fredericks

[57] ABSTRACT

The maintenance of a light spot of a chosen dimension on the surface of a rotating disc for optical playback or optical recording of data is effectively accomplished by a hydrostatic bearing apparatus. The apparatus includes: a housing for a lens assembly, which is disposed in the housing with its axis aligned parallel to the path of an incident light beam; a movable frame mounted on a support for movement in a direction substantially parallel to the light path; a pair of leaf springs coupling the housing to the frame for maintaining the axis of the lens assembly parallel to the light path; adjustable means for fixing an operating location for the movable frame; and a pressurized gas source coupled to a hydrostatic pad affixed to the lower portion of the housing, for providing a lubricating film of gas between the housing and the disc of a chosen thickness. The apparatus maintains the dimensions of the light spot focused on successive regions of the surface of the rotating disc independent of variations, if any, in the height of the successive regions.

18 Claims, 4 Drawing Figures

HYDROSTATIC BEARING APPARATUS

The present invention relates generally to novel hydrostatic bearing apparatus, and particularly to such apparatus of a form suitable for use, for example, in optical playback and optical recording systems to maintain the dimensions of a light spot focused on the surface of a rotating disc despite variations of height of successive regions of the rotating disc surface.

In accordance with the present invention, spring means serve to preload a fluid bearing formed by a fluid film between a housing assembly and a moving member. The spring means take the form of a pair of similar leaf springs disposed in parallel relationship between a movable frame and the housing assembly. The frame is moved to an operating position bending the housing-secured ends of the leaf springs away from the member to preload the springs. The effective spring constant of the fluid film is appreciably larger than the spring constant of the leaf spring pair. When displacements of the surface of the moving member (toward or away from the housing) occur, the leaf spring configuration permits the stiff spring formed by the fluid film to effect substantially corresponding displacements of the housing assembly without disturbance of the housing attitude.

In optical disc recording and playback systems, a lens system is employed to focus a light spot on successive regions of the surface of a rotating disc. It is desirable, in both types of systems, to closely maintain the dimensions and shape of the focused light spot. Variations in the effective height of the successive disc surface regions subjected to light impingement, however, will interfere with such maintenance unless a compensating adjustment in the location of the lens system is effected.

In an illustrative application of the principles of the present invention, the novel bearing apparatus of the present invention is employed to effect lens systems location control for the aforesaid spot maintenance purposes in an optical disc recording or playback system. The parallel leaf springs position a lens housing so that the lens axis lies parallel to the path of an incident light beam. The lens focuses a light spot of desired dimensions on successive regions of a rotating disc surface, while the lens housing rests on a film of air formed between the housing and the rotating disc with air supplied from an air source of controlled pressurization.

When variations occur in the effective height of the disc surface region upon which the light spot is to be focused, the relatively stiff spring formed by the air film forces a compensating relocation of the lens housing to maintain the desired light spot dimensions. The housing relocation is accommodated by the leaf springs in a manner restricting the housing to a translational movement so as to maintain a desired lens attitude. The spot dimension maintenance is thus effected in a simple manner without the need for separate surface probes (as employed, for example, in U.S. Pat. No. 3,704,659 — Sliwkowski, et al., and U.S. Pat. No. 3,815,975 — Brownscombe), without requiring a flexible structure for the disc, and the floating thereof in operation (as, for example, employed in the system described in the article by Ahmed et al., entitled "Aerodynamic Stabilization of Video Discs", and appearing in the May 1975 issue of the IEEE Transactions on Consumer Electronics), and without the complexity of piston-controlled floating bearings (as used, for example, in U.S. Pat. No. 3,081,682 — Khoury).

For an example of a disc playback system in which the present invention may be advantageously employed, reference should be made to the copending U.S. Pat. application Ser. No. 618,228, filed Sept. 30, 1975, for Wilber Clarence Stewart. The Stewart application describes a system for optical playback of spirally grooved video disc records of the RCA type described generally in the article entitled "The RCA 'Selectavision'Video Disc System — a status report", appearing on pages 48–51 of Vol. 20, No. 4 of the RCA Engineer. The recorded information track on these records appears as a succession of slots formed as depressions extending across the curved bottom of the groove, and alternating with relatively non-depressed regions of the curved bottom. In the player system of the Stewart application light supplied by a blue HeCd laser (wavelength of 0.442 micrometer) is focused by a focusing lens system to provide, at the disc surface, a light spot having a half-intensity longitudinal dimension of approximately 0.33 micrometer. A cylindrical lens system, preceding the focusing lens, establishes an elliptical contour for the focused light spot so that the half-intensity lateral dimension thereof is approximately 2 micrometers. During playback, the disc is rotated on a turntable, while the turntable is moved laterally so that the spot tracks the spiral groove of the disc.

In use of the bearing apparatus of the present invention for control of the focusing lens of the Stewart system, air passing through the orifice pad of a hydrostatic bearing disposed on the lens housing just above the rotating disc surface supports the weight of the lens and housing and the force of the springs at a small distance (of the order of one-thousandth of an inch) above the disc. The distance (illustratively, 10 micrometers) is such that the air film operates in the so-called lubricating region. The air film forms a very stiff air spring so that this particular gap is maintained with close tolerance as the lens housing follows the vertical translational excursions of the disc, thus maintaining the focused spot dimensions and shape. The apparatus of this invention has been operated successfully with a lens means requiring, approximately, plus or minus one-half micrometer focus accuracy, with discs having up to 25 micrometers vertical runout.

Objects, features and advantages of the present invention will be recognized by those skilled in the art upon a reading of the following detailed description and an inspection of the accompanying drawings wherein.

Figure 1:
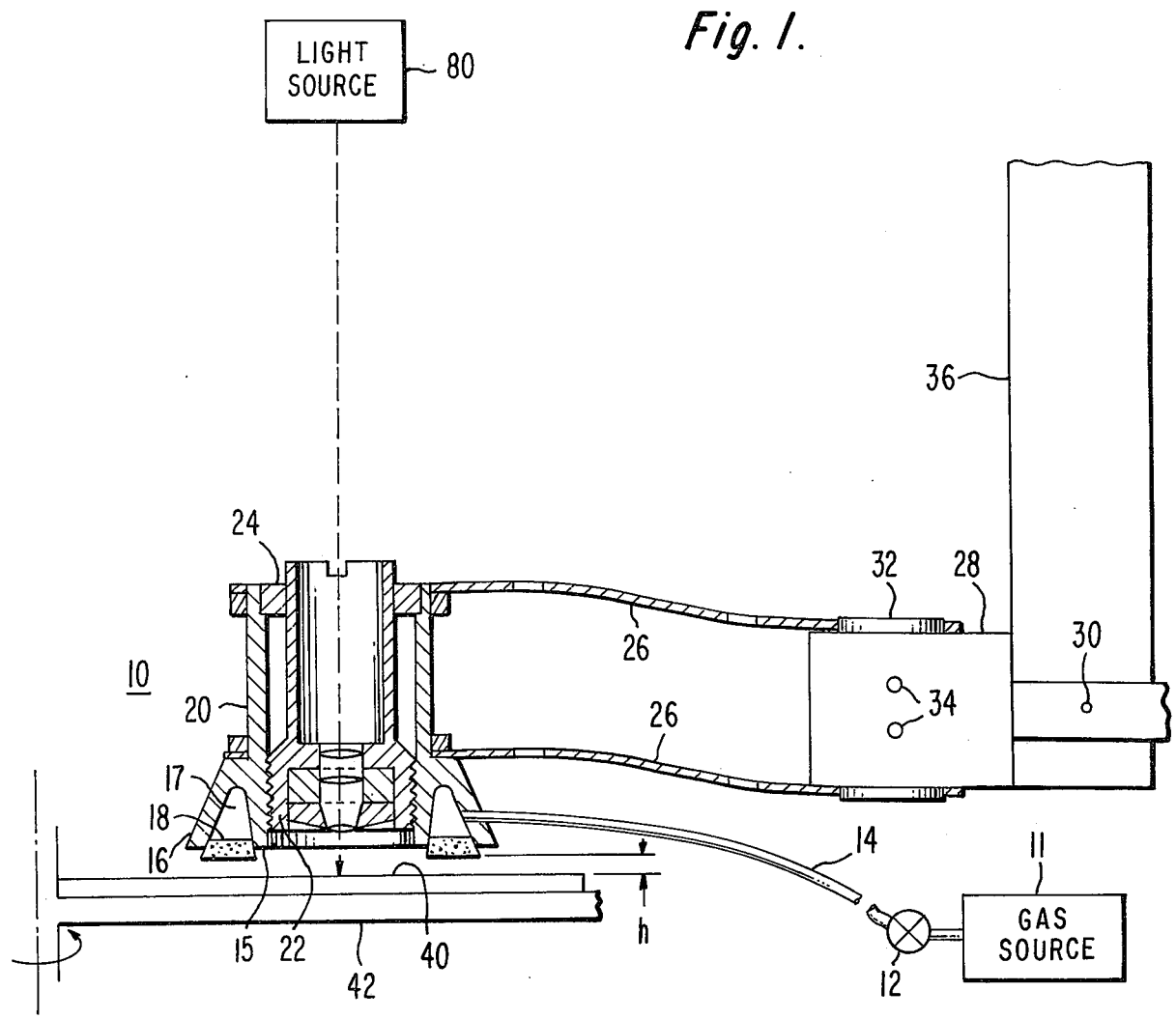
FIG. 1 illustrates a portion of an optical disc playback system incorporating hydrostatic bearing apparatus in accordance with an embodiment of the present invention.

With reference to FIG. 1, a light beam emanating from light source 80 enters lens assembly 22, mounted in a housing 20, and emerges as a focused beam of light that forms a light spot of a defined shape and size on the surface of a disc record 40.

Disc record 40 is rotated by turntable 42 while turntable 42 is laterally translated by a transporting means (not shown) such that successive regions in the successive convolutions of a spiral information track of disc 40 are exposed to the light focused by lens asembly 22.

The lens housing 20 is secured between correspondingly apertured ends of a pair of similar leaf springs 26, which extend in parallel relationship from opposite ends of a rotatable post 32 in a movable frame 28. An air film is formed between the bottom of housing 20 and disc 40, when pressurized air from a source 11 is communicated through pressure control 12 and hose 14 to an annular chamber 17 formed at the bottom of housing 20, and is allowed to escape therefrom through the multiplicity of orifices of a porous pad 18, affixed between the inner sill 15 and outer sill 16 of chamber 17. Frame 28 is subject to vertical movement along a support structure 36, and locking at a selected vertical level by frame locking screw 30. The vertical level selected for operation is such that the housing-secured ends of springs 26 are bent away from the surface of disc 40 to preload springs 26.

As disc 40 is rotated, variations in the average height of the disc region beneath the air film formed between the pad 18 and disc 40 cause a compensatory readjustment of the vertical level of the lens housing 20, as the air film reacts as a relatively stiff spring. The characteristics of springs 26 are chosen to provide a spring constant which is appreciably smaller (e.g., 1:50) than the effective modulus of the spring formed by the air film, so that the vertical movements of the lens assembly may substantially match the disc surface height excursions. With the leaf springs 26 disposed to form, when unloaded, a parallelogram with the axes of housing 20 and frame post 32, the springs ensure restriction of housing motion to a translational movement, so as to avoid changes in the attitude of the lens assembly 22 and any consequent spot distortions. A ring 24, of vibration-absorbing material, interposed between lens assembly 22 and housing 20, may be used to prevent vibration of assembly 22 in the housing.

Figure 2:
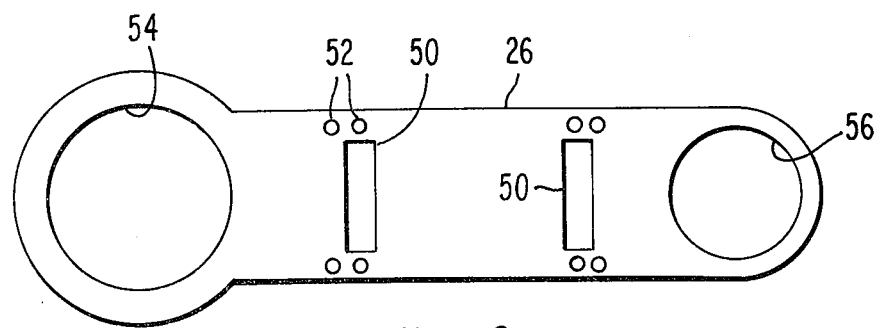
FIG. 2 illustrates a plan view of a leaf spring utilized in the apparatus of FIG. 1.

As shown in the plan view of FIG. 2, each leaf spring 26 is provided at one end with an aperture 54 dimensioned to receive lens housing 20 of FIG. 1, while a second aperture 56 is provided at the opposite end with dimensions suitable for reception of post 32 of FIG. 1. Slots 50 are provided in an intermediate region of the leaf spring 26 to establish desired bending points for the spring. Additional small apertures 52 may be provided in the immediate vicinity of slots 50, when required for precision adjustment of the modulus of the leaf spring 26.

Figure 3:
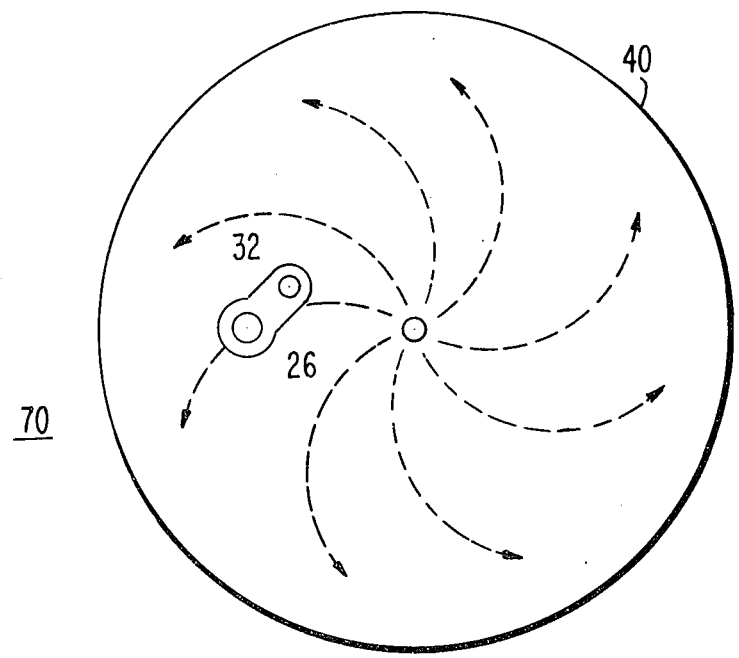
FIG. 3 illustrates an operating position for the bearing apparatus of FIG. 1.

FIG. 3 provides a plan view of the rotating disc 40, with a plurality of curved arrows illustrating a pattern of ambient air flow adjacent the disc surface produced as a result of the disc rotation. As illustrated in FIG. 3, a desirable orientation of the above-discussed bearing apparatus is such as to align the axes of leaf springs 26 so as to lie substantially parallel with the direction of such rotation-induced air flow in the regions underlying the spring, to minimize leaf spring twisting by such air flow. Such orientation may be established (for the particular rotation speed employed) by selecting an appropriate rotational position for post 32 relative to frame 28, and employing post locking screws 34 to lock post 32 in the selected position. An illustrative orientation choice results in a 45° angle between the spring axes and a disc radius through the housing axis location. The sense of the aforesaid spring alignment is desirably as shown in FIG. 3 so that the air flow tends to place the springs 26 in tension.

Figure 4:
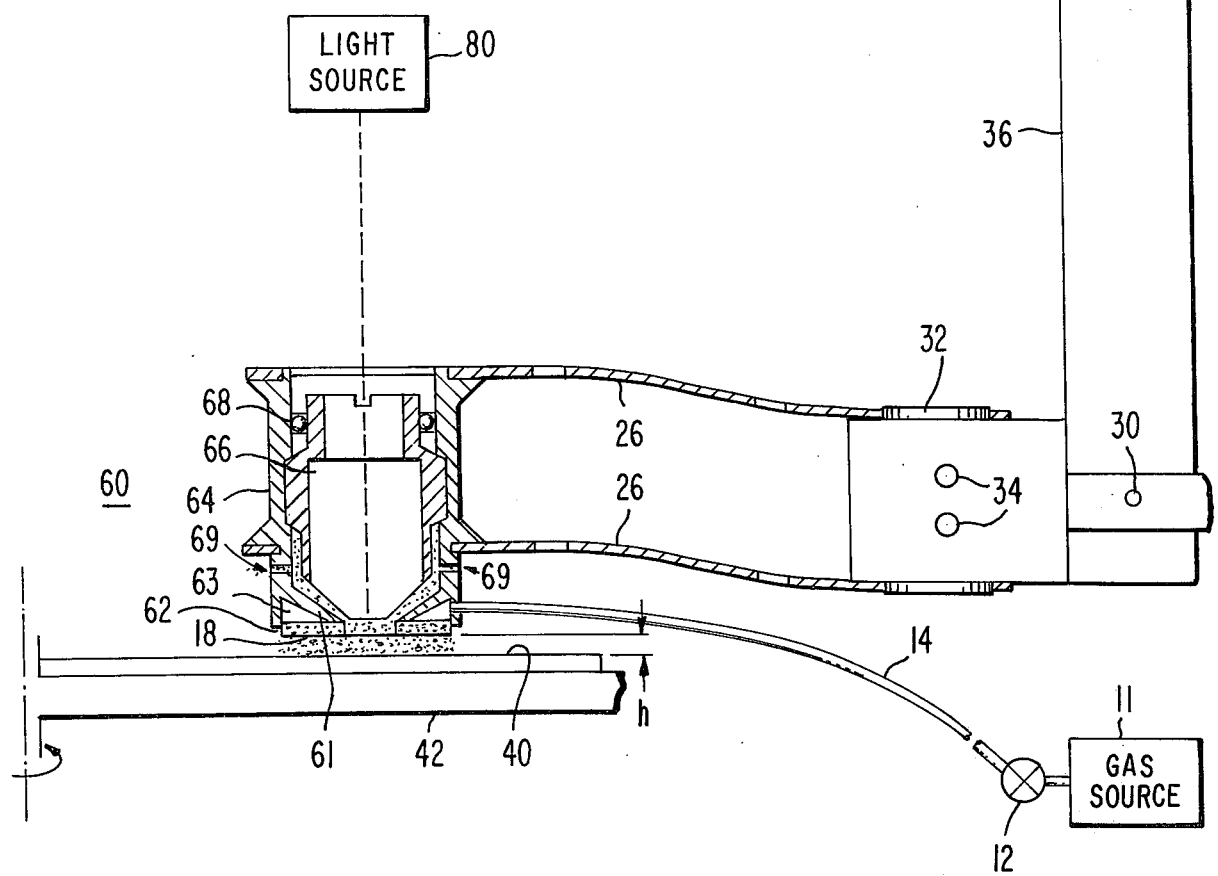
FIG. 4 illustrates modification of the FIG. 1 apparatus in accordance with a further embodiment of this invention.

In FIG. 4, a modification of the hydrostatic bearing apparatus 10 of FIG. 1 is illustrated in accordance with a further embodiment of the present invention. In the bearing apparatus 60 of FIG. 4, a housing 64 for a lens assembly 66 is secured to apertured ends of leaf springs 26, as in the FIG. 1 arrangement. However, a modification of the housing bottom configuration enables the provision of an annular chamber 63 with a reduced outer diameter, smaller than the outer diameter of the spring ends secured to the housing 64. The associated reduction in the outer diameter of the porous pad 18, affixed between the sills 61, 62 of chamber 63, results in a reduction in the surface area of the air film between pad and disc. A more accurate following of disc surface excursions may thus be realized, since the housing translation is responsive to the average of a more confined area of height sampling.

In illustrative realizations of the structure illustrated in FIG. 4, the natural frequency of apparatus 60 in free vibration is chosen to be close to the major frequency of excitation of the surface following system (e.g., the frequency of rotation of the disc, or, in some instances, a harmonic thereof). with an apparatus having these frequency characteristics, avoidance of spurious vibrations is a major concern. It was found that oscillation avoidance was enhanced for the FIG. 4 structure by the inclusion of ports 69 in the walls of housing 64, providing communication between the housing exterior and the central region of the housing bottom. The ports 69 serve to vent the air otherwise subject to trapping in said central region. An O-ring 68 of vibration-absorbing material may additionally be interposed between the lens assembly 66 and housing 64 for vibration reduction purposes.

It may be noted that the FIG. 1 arrangement, providing threaded engagement between the lens assembly 22 and housing 20, permits focus control via rotational adjustment of the lens assembly 22, whereas the position of the lens assembly 66 in the housing 64 of FIG. 4 is fixed. However, since the height (h) of the gap established between pad 18 and disc 40 is dependent upon the pressurization of the gas supplied to the pad 18, a convenient facility for focus control, which may be adjusted during system operation, is available in both arrangements by Providing a suitable control 12 of the gas pressure in supply line 14.

What is claimed is:

1. A hydrostatic bearing apparatus for maintaining a housing assembly at a chosen distance from the surface of a moving member; said apparatus comprising in combination:
   a. a support structure;
   b. a movable frame mounted on said support structure for movement in a direction substantially perpendicular to said surface of said moving member;
   c. a pressurized lubricant source;
   d. hydrostatic pad means, disposed in a lower portion of said housing assembly and coupled to said lubricant source, for providing a lubricant film of a chosen thickness between said lower portion of said housing and said surface of said moving member;

e. adjustable means for fixing an operating location for said movable frame; and f. spring means for preloading the hydrostatic bearing formed by said lubricant film during occupancy of said operating location by said frame, comprising a first leaf spring and a second leaf spring disposed in substantially parallel relationship, said first leaf spring having a first end connected to an upper portion of said housing assembly and a second end connected to an upper portion of said frame, said second leaf spring having a first end connected to said lower portion of said housing assembly and a second end connected to a lower portion of said frame; said spring means also serving to orient said housing assembly in such manner that a longitudinal axis of said housing assembly is substantially perpendicular to said surface of said moving member.

2. Apparatus in accordance with claim 1 wherein the proximity of said frame to said surface of said moving member is such, when said frame is fixed in said operating location during provision of said lubricating film, that said first ends of said springs are bent away from said surface of said moving member to preload said springs without disturbing the substantial perpendicularity of said longitudinal axis of said housing assembly relative to said surface of said moving member.

3. Apparatus in accordance with claim 2 wherein each of said leaf springs has a strain characteristic such that the deformation of said springs due to said preloading is recoverable upon removal of said preloading, and wherein each of said springs also has a stress characteristic such that each spring will endure without fracture the stress force caused by said bending of said springs.

4. Apparatus in accordance with claim 2 wherein said lubricant is a gas, and wherein the pressurization of said gas provided by said source establishes a thickness for said film which is of the order of one-thousandth of an inch.

5. Apparatus in accordance with claim 4 wherein said gas source includes means for adjusting the pressurization of said gas to vary the thickness of the established film.

6. Apparatus in accordance with claim 1 wherein the dimensions and material of said leaf springs are chosen to provide a given spring constant for said spring means which is appreciably smaller than the effective spring constant of said lubricant film.

7. Apparatus in accordance with claim 6 wherein the ratio of said spring constants is such that a given translational movement of said surface of said moving member results in a translational movement of said housing assembly differing therefrom by less than one-tenth the distance of said translational movement of said surface.

8. In a system utilizing lens means interposed in the path of a beam of light to focus a spot of light on successive regions of the surface of a rotating disc; apparatus for maintaining the dimensions of the light spot focused on said successive regions substantially independent of variations, if any, in the height of said successive regions, said apparatus comprising:

a. a housing for said lens means;
b. a support structure;
c. a movable frame mounted on said support structure for movement in a direction substantially parallel to said path of said beam of light;
d. a pressurized lubricant source;

e. hydrostatic pad means, disposed in a lower portion of said housing such that the focus of said light spot on successive regions of said surface of said rotating disc is not obstructed, and coupled to said lubricant source, for providing a lubricant film of a chosen thickness between said housing and said disc surface;

f. adjustable means for fixing an operating location for said movable frame; and g. spring means for preloading the hydrostatic bearing formed by said lubricant film during occupancy of said operating location by said frame; said spring means comprising a first leaf spring having a first end connected to an upper portion of said housing and a second end connected to an upper portion of said frame, and a second leaf spring having a first end connected to said lower portion of said housing and a second end connected to a lower portion of said frame; said spring means also serving to orient said housing in such manner that the axis of said lens means is substantially aigned with said light path; the dimensions and characteristics of said leaf springs being such that said spring means is provided with a spring modulus which is appreciably smaller than the effective spring modulus of said lubricant film.

9. Apparatus in accordance with claim 8 wherein said frame includes a post extending through said frame in a direction also substantially parallel to said light path, wherein said first end of said first leaf spring is apertured to receive said top portion of said housing while said second end of said first leaf spring is apertured to receive an end of said post extending through said top portion of said frame, and wherein said first end of said second leaf spring is apertured to receive said lower portion of said housing while said second end of said second leaf spring is apertured to receive the opposite end of said post extending through said lower portion of said frame.

10. Apparatus in accordance with claim 9 wherein each of said leaf springs has additional apertures in a region between said apertured ends.

11. Apparatus in accordance with claim 9 wherein said lubricant is air, and wherein said springs are rotatable about the longitudinal axis of said post, said springs being oriented during system operation so as to lie approximately parallel to the direction of air flow over the region of said disc surface upon which said light spot is focused during disc rotation.

12. Apparatus in accordance with claim 8 wherein the proximity of said frame to said disc surface is such, when said frame is fixed in said operating location during provision of said lubricating film, that said first ends of said springs are bent away from said disc surface to preload said springs without disturbing the alignment of said principal axis of said lens means with said light beam path.

13. Apparatus in accordance with claim 8 wherein the ratio of said spring moduli is such that a given translational displacement of said disc surface results in a translational displacement of said housing assembly differing therefrom by less than one-tenth the distance of said translational displacement of said disc surface.

14. Apparatus in accordance with claim 8 wherein said pressurized lubricant is a pressurized gas and wherein said pressurized gas provided by said source establishes a thickness for said film which is of the order of one-thousandth of an inch.

15. Apparatus in accordance with claim 14 also including means for altering the dimensions of said light spot on said disc surface, said last-named means comprising means for adjusting the pressurization of the gas provided by said source to vary the thickness of said film.

16. Apparatus in accordance with claim 14 wherein said lower portion of said housing includes an annular recess surrounding a housing region occupied by said lens means and separated therefrom by an annular sill, said recess being in communication with said source; wherein said hydrostatic pad means includes an annulus of porous material secured in said recess; and wherein said housing is provided with a part extending between the exterior of said housing and said housing region for venting the portion of said gas film lying beneath said lens means.

17. Apparatus in accordance with claim 16 wherein the characteristics of said leaf springs are selected to establish a natural resonant frequency for said bearing apparatus close to an integral multiple of the frequency of rotation of said disc.

18. Apparatus in accordance with claim 8 including vibration-absorbing material interposed between said lens means and a portion of said housing.

* * * * *